Feb. 16, 1960　　　H. B. O. DAVIS　　　2,925,557
PEAK INDICATING VOLTMETER
Filed Oct. 20, 1955
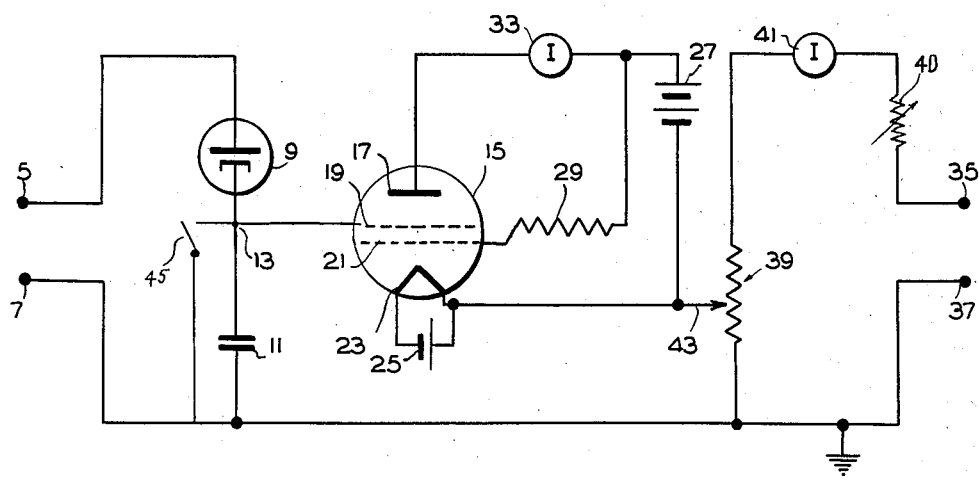
INVENTOR.
HENRY B.O. DAVIS
BY George Sipkin
B. L. Zanquill

United States Patent Office 2,925,557
Patented Feb. 16, 1960

2,925,557
PEAK INDICATING VOLTMETER

Henry B. O. Davis, Kensington, Md., assignor to the United States of America as represented by the Secretary of the Navy Application October 20, 1955, Serial No. 541,871

2 Claims. (Cl. 324—103)

(Granted under Title 35, U.S. Code (1952), sec. 266)

The invention described herein may be manufactured and used by or for the Government of the United States of America for governmental purposes without the payment of any royalties thereon or therefor.

This invention relates to vacuum tube voltmeters; and more particularly to a very accurate peak indicating voltmeter; and more specifically to a peak indicating voltmeter having a tremendously high input impedance which utilizes an indicating means producing a flat frequency response from D.-C. to well into the megacycle region.

Heretofore various methods have been employed to measure the peak amplitude of a varying voltage. One of the methods in use to measure peak voltages is the conventional slide back voltmeter which utilizes a triode operating at or near cut off. An applied positive signal causes the tube to conduct thereby rectifying the signal and actuating a plate current milliammeter. A potentiometer in the grid cathode circuit is adjusted to change the bias on the triode until the milliammeter reads the initial value of plate current and a reading of the voltage across the changed potentiometer setting is taken as a measure of the peak voltage.

This prior method has several drawbacks in that it has very great inaccuracies at low voltage readings due to the broad cut-off point of the triode and in that the energy in the peaks which cause the tube to conduct must be sufficient to produce an average deflection of the meter before it can be detected. Further the grid leak resistance usually employed in these meters limits the input impedance to values prohibiting its use for many high impedance measurements.

Another method in use is a diode capacitor arrangement wherein the capacitor charges to approximately peak voltage through the diode. The voltage reading is usually developed across a resistance shunting the capacitor. This method suffers the disadvantage that any load across the capacitor prevents it from charging to the true peak value of the applied signal. Further, linearity of diodes is poor at low voltage levels when a finite load resistance is used, again resulting in inaccurate low voltage readings. A modification of this method utilized an amplifier to drive the meter; but again, inaccuracies because of drift due to grid current, and non-linearity of the amplifier and meter left much to be desired.

The present invention eliminates the shortcomings of the prior art and provides an instrument for accurately measuring peak A.C. or D.C. voltages over a wide range. The linearity of the reading is independent of tube and meter characteristics, input impedance is in the order of several million megohms, and errors that may arise from low pulse rates, high frequency or waveform errors are easily corrected. Briefly these novel and desirable results are achieved by a meter comprising a diode detector capacitor arrangement connected across input terminals across which a signal to be measured is applied, said capacitor being adapted to charge to substantially the peak of an applied signal. An electrometer tube connected across said capacitor is adapted to measure its charge, and a regulated reference voltage source and calibrated potentiometer associated with, though isolated from dynamic conditions within said tube, is operable to adjust the bias of said tube to its initial condition. The changed setting of the potentiometer indicates the peak amplitude of the input voltage.

An object of this invention therefor is to provide a very accurate peak indicating voltmeter.

Another object is the provision of a peak indicating voltmeter which accurately indicates low voltages without the usual errors due to tube and meter characteristics.

Still another object is to provide a peak indicating voltmeter which accurately indicates a wide range of voltages without the necessity of changing scales.

A further object is to provide a peak indicating voltmeter which utilizes an indicating means which is essentially an infinite impedance thereby producing a flat frequency response from D.-C. to well into the megacycle region and a tremendously high input impedance.

A still further object is the provision of a voltmeter adapted to read the peak amplitude of positive or negative A.C. or D.C. voltages or voltage pulses of short duration with good accuracy.

Other objects and many of the attendant advantages of this invention will be readily appreciated as the same becomes better understood by reference to the following detailed description when considered in connection with the accompanying drawings wherein:

The figure shows a schematic diagram of the circuit arrangement of the novel peak indicating voltmeter.

Referring now to the drawing, there is shown a pair of input terminals 5 and 7 to which the voltage to be measured is applied. A diode detector 9, preferably an indirectly heated 6AL5 vacuum diode, is connected in series with a relatively large capacitor 11 across input terminals 5 and 7. For extremely high frequency measurements a diode probe may be used. The junction 13 between diode 9 and capacitor 11 is directly connected to an electrometer tube 15, preferably a VX41A, which comprises a plate 17, a control grid 19, an accelerating grid 21, and a cathode 23 directly heated by source 25. The voltage indicative of the peak value of the applied signal across the capacitor 11 is applied to the control grid 19. The accelerating grid is connected to a power supply or biasing source 27 of B+ through a dropping resistor 29.

The wires comprising control grid 19 and accelerating grid 21 are aligned so that the control grid wires lie in the shadow of the accelerating grid wires. Electrons accelerated by grid 21 have sufficient velocity to pass the wires of control grid 19 without being attracted thereto, thus preventing any flow of grid current. Consequently the impedance across capacitor 11 looking toward tube 15 is tremendously high and in the order of several million megohms.

In the plate circuit of tube 15, a current meter 33 is placed to indicate tube plate current resulting from the potential applied to control grid 19.

A reference voltage from a regulated power source (not shown) is connected across terminals 35 and 37 which are connected across a potentiometer 39 calibrated in volts. A calibration adjustment rheostat 40 is provided to adjust the total voltage across potentiometer 39 to the highest voltage desired to be indicated. In a preferred embodiment for obtaining accurate low voltage resolution, the potentiometer 39 was a 10 turn helical potentiometer, each full turn of which represented 10% of the reference voltage. An ammeter 41 placed in the potentiometer circuit provides a means of checking the regulated source to insure that it does not change. The variable arm 43 of the potentiometer 39 is connected directly to the cathode 23 of electrometer tube 15.

Initially with no signal applied to input terminals 5 and 7 and with potentiometer arm 43 set at zero or ground, the plate of diode 9 is grounded and capacitor 11 will charge to the contact potential of the diode which is due to the difference between two metals (plate and cathode of the diode). This contact potential results from and is equal to the difference in the work functions in electron volts of the metals. Hence, though no external e.m.f. or signal is applied, the electrons within the envelope of diode 9 are acted upon by the contact potential difference between its plate and cathode. Capacitor 11 will therefore charge to a voltage determined by the contact potential of diode 9. Vacuum tube 15 is normally conducting and the voltage due to the contact potential on capacitor 11 will cause current meter 33 to indicate some relatively small value of current. This reading is taken as a balance or null point to compensate for the contact potential. The instrument is now in readiness to measure unknown peak voltages very accurately.

When an unknown voltage to be measured is applied to input terminals 5 and 7, capacitor 11 charges to substantially the peak positive value of the voltage. Since control grid 19 is connected to junction 13, conduction in tube 15 increases and its plate current actuates meter 33 to a value of current related to the charge on capacitor 11. At this point arm 43 of calibrated potentiometer 39 is adjusted to change the bias on tube 15 to its initial condition. This is accomplished by noting the balance or null point on meter 33. The position of potentiometer arm 43 is then read off as indicating the peak value of the applied signal. A switch 45 connected across capacitor 11 is provided to discharge capacitor 11 after each reading to prepare the voltmeter for further readings.

The linearity of the voltage indication may be seen to be independent of tube and meter characteristics, inasmuch as no tube current flows through the potentiometer 39 and because the tube and meter are always brought back to the same operating point. The range of voltage readings is limited only by the reference voltage which may be accurately calibrated on the potentiometer from less than 1 up to 100 volts or more. This feature obviates changing ranges over a wide range.

The accuracy of the instrument is superior to any known peak indicating instrument in that the input impedance to the electrometer tube 15 is tremendously high, being limited only by the leakage resistance of capacitor 11 which is in the order of several million megohms. The vacuum tube driven null indicator does not affect this impedance since it does not charge or load capacitor 11 for the reason that no current is drawn by control grid 19 of tube 15 due to the action of grid 21. This high impedance acts to reduce diode linearity errors to a negligible value so as to provide accurate low voltage indications. Hence a voltmeter is provided which utilizes a vacuum tube indicating circuit which offers almost no effect on capacitor 11 and no voltages appear at the vacuum tube input other than the contact potential which is compensated for.

Obviously many modifications and variations of the present invention are possible in the light of the above teachings i.e. for VHF work the diode 9 could be mounted in a probe and the balancing could be made automatic by a servo system. It is therefore to be understood that with the scope of the appended claims the invention may be practiced otherwise than as specifically described.

What is claimed is:

1. A peak indicating voltmeter of the type described comprising a diode and a capacitor connected in series across two input terminals where said terminals are adapted to be connected to a signal voltage to be measured; a potentiometer having one end connected to one of said input terminals and said capacitor, a variable arm having voltage calibrations for indicating the peak signal voltage, and a regulated voltage applied across said potentiometer; an electrometer vacuum tube having a cathode connected to said variable arm and an anode; an indicating meter and a power supply connected in series around said electrometer tube from said anode to said cathode; a wire control grid mounted between said cathode and anode and connected to the series connection between said diode and capacitor; a wire accelerating grid mounted between said cathode and said control grid for passing a current through said tube; the control grid wires lying in the shadow of said accelerating grid wires; and means connected to said accelerating grid for biassing said accelerating grid independently of the absolute voltage level of said cathode.

2. A peak indicating voltmeter according to claim 1 and further characterized by said last named means comprising a resistor connected between said accelerating grid and said power supply.

References Cited in the file of this patent

UNITED STATES PATENTS

| | | |
|---|---|---|
| 1,611,716 | Brown | Dec. 21, 1926 |
| 2,143,219 | Wenger | Jan. 10, 1939 |
| 2,499,953 | Herzog | Mar. 7, 1950 |
| 2,541,824 | Lord | Feb. 13, 1951 |
| 2,656,498 | Goodwin | Oct. 20, 1953 |
| 2,721,978 | Thomson | Oct. 25, 1955 |

FOREIGN PATENTS

| | | |
|---|---|---|
| 731,824 | Germany | Feb. 6, 1943 |
| 887,073 | Germany | Aug. 20, 1953 |
| 697,879 | Great Britain | Sept. 30, 1953 |

OTHER REFERENCES

"Electronics," vol. 23, issue 5, pages 110, 111; pub. date May 1950.